United States Patent [19]

Waldrop

[11] Patent Number: 4,765,799

[45] Date of Patent: Aug. 23, 1988

[54] LATEX COATED ELECTRODES FOR RECHARGEABLE CELLS

[75] Inventor: Sammy E. Waldrop, Gainesville, Fla.

[73] Assignee: Gates Energy Products, Inc., Gainesville, Fla.

[21] Appl. No.: 7,313

[22] Filed: Jan. 27, 1987

[51] Int. Cl.$^4$ ............................................. H01M 4/26
[52] U.S. Cl. .................................... 29/623.5; 429/222
[58] Field of Search ............... 429/209, 212, 217, 222; 29/623.5; 141/1.1

[56] References Cited

U.S. PATENT DOCUMENTS

| | | | |
|---|---|---|---|
| 2,727,080 | 12/1955 | Moulton | 429/217 |
| 3,877,986 | 4/1975 | Catherino | 429/222 X |
| 3,918,989 | 11/1975 | Gillman et al. | 429/217 X |
| 3,954,501 | 5/1976 | Rampel | 429/222 X |
| 4,245,016 | 1/1981 | Rampel | 429/217 X |
| 4,563,370 | 1/1986 | Menard | 429/217 X |

FOREIGN PATENT DOCUMENTS 664290  6/1963  Canada.

Primary Examiner—Anthony Skapars
Attorney, Agent, or Firm—C. H. Castleman, Jr.; H. W. Oberg, Jr.; J. E. Ebel

[57] ABSTRACT

Latex coated electrodes comprising a foraminous, electrically conductive substrate which supports a paste comprising a mixture of (a) finely divided, particulate, rechargeable, active material and, (b) a fibrous interconnecting network of an unsintered, uncoalesced, hydrophobic linear fluorocarbon polymer, wherein said active material is dispersed throughout and bound in said fibrous network and being accessible to said electrolyte and to gas being generated during overcharge of the cell have excellent mechanical integrity. These electrodes have a greater storage life than similar uncoated electrodes and rechargeable cells employing these electrodes have excellent electrical properties with respect to both voltage characteristics and pressure buildup.

6 Claims, No Drawings

LATEX COATED ELECTRODES FOR RECHARGEABLE CELLS

BACKGROUND OF THE INVENTION

1. Field of the Invention

This invention relates to improved electrodes for rechargeable cells or batteries, their manufacture and use in cells containing same. More particularly, this invention relates to electrodes comprising a foraminous, conductive substrate containing a coating of electrochemically active material which has been coated with a latex material, their manufacture and use in rechargeable cells containing same.

2. Background of the Disclosure

The general manufacture and use of electrodes for electrochemical cells such as rechargeable cells is known to those skilled in the art. Such electrodes usually comprise a foraminous or perforated conductive metal substrate on which is deposited a layer of electrochemically active material. The electrochemically active material is usually applied to the substrate in the form of a paste which contains an organic binder material to provide mechanical integrity. The paste coated substrate is then subject to mild heat and pressure in order to form a compact layer of active material and dry the water or other liquids present in the paste.

Most rechargeable electrochemical cells in use today employ, as a negative electrode, a mixture of particles of cadmium oxide and cadmium metal which has been mixed with a binder material and applied to a substrate, preferably a foraminous, conductive substrate. Thus, U.S. Pat. No. 3,870,562 relates to a rechargeable cell containing a cadmium pressed negative electrode which comprises a mixture of cadmium metal spherical particles formed by condensing cadmium metal vapors in the presence of oxygen and having an average particle size of about 3–12 microns, cadmium oxide or cadmium hydroxide and a minor quantity of nickel hydroxide powder. In making the electrode, the powder mixture is blended with water and an aqueous dispersion of fluorocarbon to form a paste which is spread on the substrate, the coated substrate is then heated to a temperature not exceeding 200° F. to break the fluorocarbon dispersion without sintering the fluorocarbon.

U.S. Pat. No. 3,877, 986 claims a cadmium negative electrode similar to that employed in the '562 patent. U.S. 3,888,695 claims an improved rechargeable cell wherein the negative electrode is a cadmium electrode which comprises a mixture of spherical cadmium particles having a particles size of about 3–12 microns and cadmium oxide powder which is combined with a binder and applied to a foraminous substrate. Preferably, the cadmium metal particles are stabilized with cadmium oxide. U.S. Pat. No. 3,954,501 claims a rechargeable electrolytic cell comprising positive and negative electrodes separated by a separator wherein the cell contains an electrolyte and wherein one of the cells comprises a foraminous electrically conductive substrate which supports a paste comprising finally divided, particulate, rechargeable, active material and a fibrous interconnecting network of an unsintered, uncoalesced, hydrophobic linear fluorocarbon polymer. In this electrode the active material is dispersed throughout and bound in said network, in order to be highly accessible to the electrolyte and permeable to gas being generated during any overcharge of the cell. Preferably the polymer is polytetrafluoroethylene and the active material is a mixture of nickel and cadmium.

One of the major difficulties with these types of electrodes is their lack of integrity, friability, and the ease with which they are damaged. This results in a large loss of electrode material due to loss of the powdered, active material from the substrate during normal handling and manufacturing operations. Consequently, a significant amount of research and development has been directed towards solving this problem, but without much commercial success. By way of example, U.S. Pat. No. 3,877,986 suggests mixing the powder with about one weight percent of an appropriate binder prior to application of same to a substrate. Any suitable binder is disclosed as being useful such as polyvinyl alcohol, polyvinyl pyrollidone, polymethyl methacrylate, polystyrene and fluorocarbons. U.S. Pat. No. 3,918,989 suggests, as a "shotgun" disclosure, water-soluble resins preferably composed of molecules containing OH or NH groups such as cellulose and substituted cellulose derivative materials, starch and its derivatives, polyvinyl alcohol, pyrollidone, rubber latex resins, ovalbumin, gum arabic, locust bean gum and a significant number of other materials. These water soluble resins are taught as being mixed with a suitable plasticizer which together form a binder material for electrodes composed of active ingredients such as cadmium zinc metal powder, mercuric oxide powder and zinc oxide powder.

U.S. Pat. Nos. 4,476,205 and 4,563,370 disclose using a cured latex rubber or rubber-like material which is applied to the cadmium oxide particles before the cadmium oxide particles are added to the mixture of cadmium and cadmium oxide used to form the pressed cadmium electrode. The resulting electrode product is claimed as being flexible and capable of being rolled up into rolls, but no data is presented with respect to the electrical and pressure characteristics of a rechargeable cell containing said electrode.

There is a need in the art for pressed powder electrodes having improved mechanical strength and integrity which can be handled and processed without falling apart and which, at the same time, do not produce deleterious effects in the electrical properties of rechargeable cells containing same.

SUMMARY OF THE INVENTION

It has now been discovered that pressed powder-type electrodes possessing a combination of both good mechanical integrity and electrical characteristics when used in a rechargeable cell containing same can be achieved by coating said electrodes with a rubber or rubber-like latex. More particularly, the present invention relates to an electrode that has been coated with a latex, a process for making same and a rechargeable electrochemical cell employing same, wherein said electrode comprises a substrate supporting electrically active particulate material. The substrate may be any suitable substrate and preferably one that is electrically conductive. By latex is meant an aqueous emulsion of rubber or rubbery material, such as an aqueous emulsion of a styrene-butadiene copolymer, which is coated or applied to the electrode, with the coated electrode then heated at elevated temperature (i.e., about 250° F.) to dry the latex.

This invention has been found to be particularly useful with cadmium powder electrodes and rechargeable electrochemical cells employing same. Illustrative, but non-limiting examples of such electrodes and cells employing same include those disclosed in U.S. Pat. Nos. 3,870,562; 3,877,986; 3,888,695 and 3,954,501. Electrodes or electrode assemblies prepared according to this invention which contain cadmium oxide have also been found to have greater storage life as reflected in significantly less conversion of the cadmium oxide to cadmium carbonate with the passage of time.

In one embodiment, electrodes prepared according to the present invention comprise latex coated negative electrodes, said negative electrodes comprising a foraminous, electrically conductive substrate which supports a paste comprising a mixture of (a) finely divided, particulate, rechargeable, active material and, (b) a fibrous interconnecting network of an unsintered, uncoalesced, hydrophobic linear fluorocarbon polymer, wherein said active material is dispersed throughout and bound in said fibrous network and being highly accessible to said electrolyte and permeable to gas being generated during overcharge of the cell.

DETAILED DESCRIPTION OF THE INVENTION

As set forth above, the present invention relates to latex coated electrodes and rechargeable electrochemical cells employing same, wherein the uncoated electrode comprises a substrate supporting electrochemically active particulate material, said invention having been found to be particularly useful with cadmium powder electrodes and rechargeable electrochemical cells employing same. Such rechargeable cells are produced by constructing a negative cadmium electrode comprising a mixture of (i) powdered cadmium metal in a form which is not readily oxidizable in air yet which can be made electrochemically active, powdered nickel metal or a mixture of powdered cadmium metal and powdered nickel metal, (ii) nickel hydroxide, (iii) cadmium oxide and (iv) a binder. This mixture is then applied to a substrate in paste form. The substrate is an electrically conductive, foraminous material such as perforated, nickel plated steel.

The cadmium or nickel metal powder used to produce the electrode preferably has an average particle size of from about 3–12 microns, and more preferably 5–10 microns. If cadmium metal is present, the cadmium metal is preferably stabilized with at least 1% cadmium oxide to prevent premature oxidation of the cadmium metal particles before subsequent mixing with the cadmium oxide particles. In a preferred embodiment the nickel and/or cadmium metal particles will be more or less spherically shaped. Those skilled in the art know that such cadmium metal powder may be produced by condensing vaporized cadmium metal in the presence of a controlled amount of oxygen, which provides a mixture of metallic cadmium in the form of spherically shaped particles having an average particle size of about 3–12 microns and a minor amount of about 1–6 wt. % percent of cadmium oxide. Suitable nickel metal powder is also readily available commercially.

The cadmium metal powder described above is subsequently mixed in the desired ratio with cadmium oxide powder and preferably cadmium powder having an average particle size of about 1 micron in order to produce, in the finished electrode, a mixture providing the desired amount of precharged, electrochemically active, cadmium metal, as well as the desired amount of chargeable capacity, that is, cadmium oxide. This powder mixture is then further mixed with nickel hydroxide powder which improves anti-fading properties of rechargeable cells incorporating such cadmium electrodes and also reduces the amount of cadmium metal particles required. It is understood that all or a portion of the cadmium metal powder can be replaced with nickel metal powder.

The resulting powder mixture is then mixed with a minor amount (i.e., less than 5 wt. %) of a binder material prior to application to the substrate. Such binder material must be alkali-resistant when the electrode is to be used in an alkali electrolyte, such as KOH. In a preferred embodiment, the powder mixture is blended with de-ionized water containing an aqueous fluorocarbon dispersion. It is particularly preferred that the fluorocarbon polymer be a fibrous, unsintered, uncoalesced, linear, hydrophobic fluorocarbon polymer such as polytetrafluoroethylene (PTFE) and copolymer variations thereof. Preferably the fluorocarbon polymer will have a critical surface tension less than 32 dynes/cm and be a solid, ... i.e. exhibit a molecular weight of at least about 10,000 and preferably at least 20,000. The fluorocarbon polymer particles will be dispersed in a liquid carrier such as water and preferably de-ionized water, although any conventional carrier capable of dispersing the polymer particles may be employed. Generally dispersion to the colloidal level is preferred. Since fluorocarbon polymers are hydrophobic, it is necessary to add a surfactant or surfacewetting agent in order to maintain the dispersion of the polymer in the water. Typically the surfactant is employed in the minimum amount sufficient to dispersed the fluorocarbon polymer, which is usually less than 5 wt. % based on the weight of the polymer present in the dispersion. Although anionic, cationic, and non-anionic surfactants have been found useful in dispersing the particles of fluorocarbon polymer, non-anionic surfactants such as Rohm & Haas' Triton Y-100 non-anionic surfactant has been found to be particularly useful. A commercially available dispersion of PTFE in water is DuPont's Teflon-30, which is a dispersion of PTFE in water containing 60 wt. % colloidally dispersed PTFE, water, and about 5 wt. % octyl phenyl polyethylene oxide detergent or wetting agent.

In order to form a negative electrode, the powder mixture comprising, for example, a mixture of spherical cadmium metal particles, cadmium oxide, and nickel hydroxide is then mixed with the PTFE dispersion or slurry in order to form a paste. The powder mixture itself will generally contain less than about 25 and more preferably, less than 10 wt. % cadmium metal particles based on the total weight of the mixture of cadmium metal particles and cadmium oxide particles. The amount of nickel hydroxide will generally be less than about 10 and still more generally less than about 5 wt. % nickel hydroxide based on the total weight of nickel hydroxide, cadmium metal and cadmium oxide. The solids content of the final paste will contain less than about 5 and preferably less than about 2.5 wt. % PTFE on a total solids basis. The mass of powder, Teflon particles and water is kneaded into a paste which is then coagulated and applied into and over a foraminous substrate, such as a nickel metal screen or a screen comprising nickel plated steel. In this sense the word screen also includes a substrate that is perforated and is in a sense more of a perforated substrate than in the form of a screen. Preferably the paste will be pressed onto the substrate and further pressed through a set of rollers in order to compress and reduce the total thickness of the resulting uncoated electrode to, for example in one embodiment, about 23 mils. The maximum thickness of the electrode assembly is determined by the mechanical handling characteristics and extent of handling of the resultant electrode and the electrochemical requirements of the particular cell into which the electrode is to be assembled. The electrode assembly is then dried to remove the moisture and any other liquids from the paste, for example, by oven drying for about 30 minutes at temperatures of about 110° F. or more.

The electrodes produced in this manner broadly comprise a foraminous, electrically conductive substrate which supports a paste comprising a mixture of (a) finely divided, particulate, rechargeable, active material and, (b) a fibrous interconnecting network of an unsintered, uncoalesced, hydrophobic linear fluorocarbon polymer, wherein said active material is dispersed throughout and bound in said fibrous network and being highly accessible to said electrolyte and permeable to gas being generated during overcharge of the cell.

The dry electrode assembly is then coated with a latex which comprises an emulsion or dispersion of a rubber or a rubber-like polymer, such as a copolymer of styrene and butadiene (SBR). The latex must contain a suitable wetting agent or surfactant to enable the latex to wet and spread out over the electrode assembly. A commercially available SBR latex that has been found to be particularly useful in the practice of this invention is Dow's DL-242. Another SBR latex commercially available from Dow that has been found to be useful is their DL-277, although this latter material has not performed as well as the DL-242 with respect to the electrode integrity during subsequent battery manufacturing operations. The latex coated electrode assembly is then heated at elevated temperatures, such as about 250° F., in order to dry the latex and coagulate same. The active material dispersed throughout and bound in the fibrous polymer network of the latex coated electrode is still highly accessible to the electrolyte and permeable to gas being generated during overcharge of a cell containing same. The dried, coated electrode assembly may then be cut, wound up, etc. and subsequently employed for making electrochemical cells.

The latex coating may be applied to the uncoated electrode assembly by any suitable means known to those skilled in the art. Illustrative, but non-limiting examples include spraying, dipping, doctor blade, rollers, etc., the choice being left to the convenience of the practitioner. After the latex coating is applied, it will then be dried. Although the latex coated assembly may be dried at room temperature, it is preferred to dry same at elevated temperatures. Any elevated temperature that is convenient may be employed as long as it is below about 535° F., which is the temperature at which cadmium oxide begins to decompose. The higher the temperature, the shorter will be the drying time and vice versa. In one embodiment, it has been found convenient to heat the latex coated electrode assembly for about 30 minutes at 250° F. to dry and cogulate the latex.

The finished electrode assembly is then assembled into an electrochemical cell as a negative electrode along with a positive electrode having uncharged positive material in an amount generally exceeding the amount of uncharged negative material, i.e. cadmium oxide. Preferably the amount of active positive material will be less than the amount of cadmium oxide present in the negative electrode. Illustrative, but non-limiting examples of positive electrode materials which can be used with a cadmium negative electrode include nickel, mercury, and silver.

The positive and negative electrodes may be preassembled as a flat pack or in coiled form with appropriate separators therebetween as those skilled in the art know. The electrodes are then inserted into a alkali electrolyte resistant casing, the electrodes are electrically connected respectively to suitable terminals, and electrolyte, such as KOH, is added and the cell is sealed. After assembly and sealing the cell is then generally charged at a convenient rate to full capacity. The cell may then be discharged, for convenience and shipping, preferably through a low resistor, for example about 1.5 ohms, as those skilled in the art know.

The invention will be more fully understood with reference to the examples below.

EXAMPLES

Experimental Procedure

In these examples, electrodes were prepared comprising plaques of foraminous, nickel-plated steel which were then coated with a paste containing the electrode-active material and polymer. The foraminous, nickel-plated steel substrate was about 2 mils thick and sufficient paste was applied to both sides thereof to form a plaque which on drying had a total thickness of 22–23 mils.

The paste solids comprised a mixture of 5% spherical cadmium metal particles of 5–10 micron average particle size based on the total amount of cadmium oxide, along with 1.6 wt. % PTFE and 2.4 wt. % nickel hydroxide on total dry solids. The electrode assemblies were dried and then coated with Dow's DL-242 latex by dipping into the latex. The final, coated electrode assemblies were then heated to about 250° F. for about 30 minutes in order to dry and cure the latex.

In some cases, the polymer binder was incorporated into the base itself which was then dried. For those cases where the latex polymer was mixed with the powder and PTFE containing paste, the final electrode was also dried at 250° F.

The mechanical strength and integrity of the finished electrodes was tested by setting a pair of knife edges at a gap of 5-6 mils and pulling the finished electrode (via the substrate) through the gap at a fixed speed. The force required to pull the substrate through the gap with concomitant removal of the electroactive material was recorded and used as a quantitative measure of electrode integrity.

Finally, in all cases the electrodes were placed in conventional cells along with a nickel positive electrode to form a battery cell to which a KOH electrolyte was added and the cell then sealed. The sealed cells were put through charge/discharge cycles while measuring the pressure build-up in the cell and the voltage characteristics.

EXAMPLE 1

In this experiment, a number of electrodes were made employing the paste and procedure set forth above except that various non-latex type binder materials were added to the paste along with the PTFE dispersion. The binders employed were aqueous solutions of the polymer types set forth below.

polyvinyl acetate methyl cellulose
carboxy methyl cellulose
polyacrylamide
polyethylene oxide
polyacrylic acid In all of the above cases, the cell performance of the completed cell was unsatisfactory with respect to both voltage characteristics and high pressure buildup.

EXAMPLE 2

A number of experiments were made employing the electrode and procedure set forth above wherein Dow's DL-242 latex was mixed into the paste along with the PTFE. The amount of latex employed in the paste was such that the finished paste on the dried electrode assembly contained from between 0.75 to 10 wt. % latex on a total dry solids basis. When the amount of SBR latex was low as 0.75%, the finished electrode assembly had no mechanical integrity and fell apart very readily. The integrity was so poor that experimental electrodes made in this manner could not be made into cells. When the amount of latex in the paste on a dry-weight basis was as much as 1.5–2.8%, the so-formed electrodes had reasonable mechanical integrity, but the electrical properties of cells made incorporating these electrodes were poor with respect to voltage characteristics and pressure buildup.

EXAMPLE 3

A number of experimental electrodes were made following the general experimental procedure set forth above which were coated with Dow's DL-242 latex instead of employing the latex in the paste as was done in example 2. The latex-coated electrodes were then dried at 250° F. for about thirty minutes. The mechanical integrity and handling characteristics from these electrodes was far superior to any of the others. These electrodes had from 3–5 to as much as 10 times the mechanical strength of the other electrodes. These electrodes could be handled with relative ease and could also be wound up without the electroactive material falling off. Moreover, cells made employing these latex coated electrodes had excellent voltage and pressure properties.

What is claimed is:

1. A process for producing a cadmium negative electrode for a rechargeable cell comprising:
   (a) forming a paste of particulate material comprising a mixture of rechargeable, electrochemically active cadmium material including cadmium metal, cadmium oxide, and a binder;
   (b) applying said paste to a substrate;
   (c) drying said paste coated substrate;
   (d) coating said paste coated substrate with a latex material so that such latex material is confined substantially to the surface of the paste coated substrate; and
   (e) curing said latex to produce said electrode.

2. The process of claim 1 wherein said active material comprises a mixture of (i) powdered cadmium metal, powered nickel metal or mixtures thereof, (ii) nickel hydroxide, and (iii) cadmium hydroxide, and wherein said binder comprises a fibrous, unsintered, uncoalesced, linear hydrophobic polymer.

3. The process of claim 1 wherein said coating comprises a copolymer of styrene and butadiene.

4. A process for producing a cadmium negative electrode for a rechargeable alkaline cell comprising:
   (a) forming a paste of particulate material free of any substantial portion of latex material and comprising a mixture of rechargeable, electrochemically acharageable, electrochemically active material including a mixture of powered cadmium metal, powered nickel metal or mixtures thereof, nickel hydroxide, cadmium oxide and cadmium hydroxide, and a binder comprised of a fibrous, unsintered, uncoalesced, linear hydrophobic polymer;
   (b) applying said paste to a substrate;
   (c) drying said pasted substrate;
   (d) coating said pasted substrate with a latex material so that such latex material is confined substantially to the surface of the pasted substrate; and
   (e) curing said latex by heating at elevated temperature, to produce an electrode.

5. The process of claim 4 wherein the paste coated substrate is heated at a temperature from about 250° to about 535° F. for a period of time sufficient to dry and coagulate the latex coating.

6. The process of claim 5 wherein said coating comprises a copolymer of styrene and butadiene.

* * * * *